Aug. 8, 1950     G. JANSON, JR     2,517,571
VALVE COUPLING
Filed Feb. 19, 1947
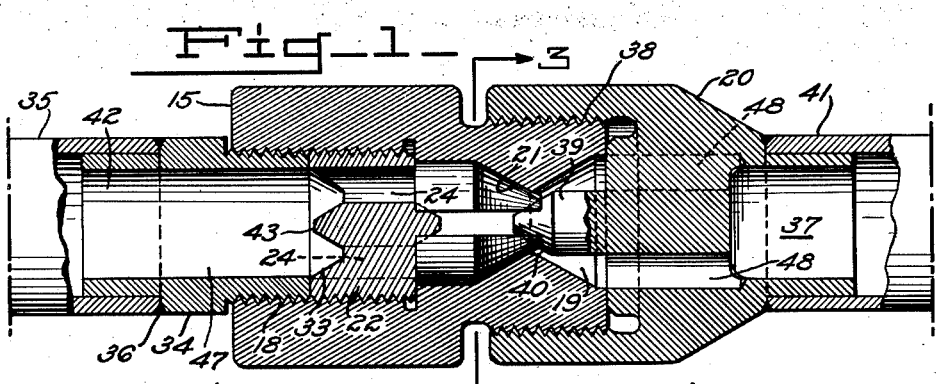
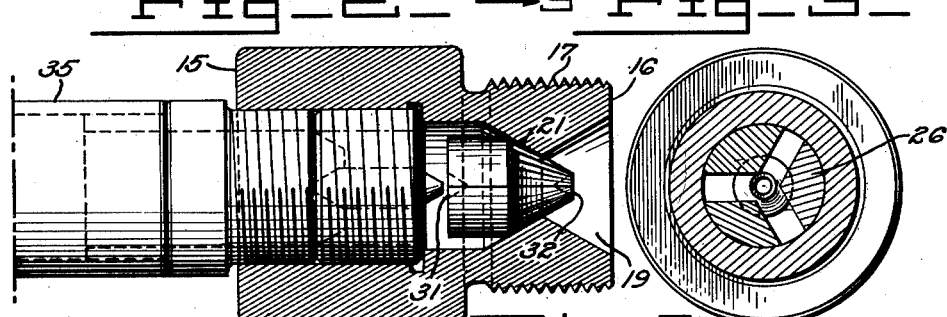
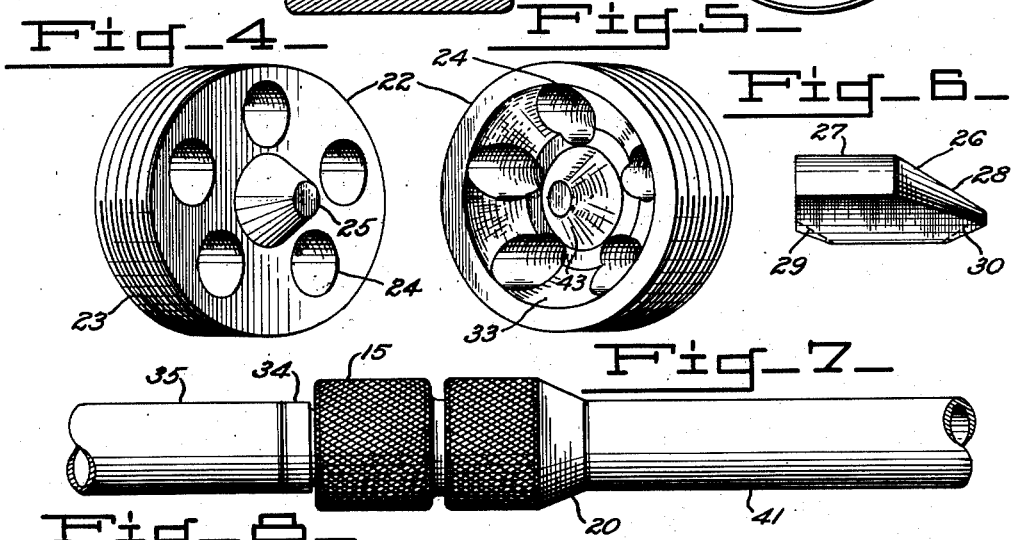
Inventor
Gotthard Janson, Jr.

Patented Aug. 8, 1950

2,517,571

UNITED STATES PATENT OFFICE 2,517,571

VALVE COUPLING

Gotthard Janson, Jr., Lansing, Mich.

Application February 19, 1947, Serial No. 729,637

2 Claims. (Cl. 284—18)

(Granted under the act of March 3, 1883, as amended April 30, 1928; 370 O. G. 757)

This invention relates to a coupling device which permits joining of a high pressure fluid line without loss of fluid or formation of air pockets within the line.

The invention described in this patent may be manufactured and used by or for the Government for governmental purposes, without the payment of any royalty thereon to the inventor.

Many prior art devices utilized to couple a high pressure line, such as air hoses between railroad cars or truck trailers where air pressure is utilized to actuate the brake shoes, have been far from satisfactory. These coupling devices have commonly employed the usual ball and spring valve which are generally satisfactory when new. However, after a short period of usage corrosion weakens and finally causes spring failure. Deterioration of the ball surface through pitting and fissuring due to the corrosive action of various elements contained in the fluid may also be anticipated.

Accordingly, it is an object of this invention to provide an improved valve coupling to positively retain the fluid in high pressure fluid lines without loss thereof when connecting or disconnecting such lines.

Another object of this invention is to provide a valve coupling for high pressure fluid lines having a minimum of moving parts and which may be inexpensively manufactured.

The specific nature of the invention as well as other objects and advantages thereof will clearly appear from a description of a preferred embodiment as shown in the accompanying drawings in which:

Fig. 1 is a longitudinal sectional view of the valve coupling embodying this invention shown in assembled relation wherein the fluid is permitted to pass through such coupling;

Fig. 2 is a longitudinal view partly in section of the housing wherein the valve is closed preventing passage of fluid therethrough;

Fig. 3 is a cross sectional view taken along the line 3—3 of Fig. 1;

Fig. 4 is a perspective view of the plug member showing the forward face thereof;

Fig. 5 is a similar view showing the rear face thereof;

Fig. 6 is a side elevational view of one of the segment closure sections;

Fig. 7 is a side elevational view of the valve coupling shown in assembled relation connecting the ends of the fluid line; and Fig. 8 is a detail longitudinal sectional view of a modified form of coupling.

This invention essentially comprises a coupling for joining a pressure line including a valve which is provided with a plurality of segment-like closure members seated within a recess in one-half of the coupling. When the coupling is disconnected the fluid under pressure forces the segments together thereby preventing passage thereof. When the two halves of the coupling are joined a conically shaped member provided in the other half thereof together with a conically shaped member in the first half, forces separation of the closure members, thus permitting fluid to pass unrestricted through the fluid line.

In Fig. 1 there is shown in assembled relation a valve coupling embodying this invention comprising mainly a valve housing 15 and a coupling member 20. Housing 15 is provided with a reduced diameter forward end portion 16 having exterior threads 17 thereon. A threaded cylindrical axial recess 18 is provided in the rear portion of housing 15 and a conical recess 19 is provided in the end portion 16. Intermediate conical recess 19 and the bottom of recess 18 there is provided a substantially conically shaped bore portion 21 communicating with recess 19 for a purpose to be later described.

A plug 22 having an exteriorly threaded surface 23 permits such plug to be screwed into recess 18 until the forward face of plug 22 contacts the bottom of such recess. A plurality of transverse holes 24, preferably evenly spaced about the face of plug 22, are provided to permit passage of fluid therethrough as will be later described. A truncated cone-shaped projection 25 is axially formed on the forward face of plug 22. The rear face of plug 22 is recessed as shown at 33 to produce a conical projection 43 therein. Recess 33 and conical projection 43 are provided to better admit fluid through holes 24 as will be later shown.

In the conically shaped bore portion 21, adjacent recess 18, there is placed a plurality of closure members 26. In the preferred application of this invention three of such members are utilized as shown in Fig. 3. More or less of such members may be utilized as desired. Each closure member 26 is provided with a cylindrical rear portion 27 and a conically shaped forward portion 28 and each is generally segmental in form as shown in Fig. 3. A partial conically shaped notch 29 and 30 is provided on the inside rear and forward edges respectively as shown in Fig. 6. When closure members 26 are assembled in housing 15 and forced together as shown in Fig. 2 such partial conical recesses form opposed conical recesses 31 and 32. The plug 22 when screwed into recess 18 secures closure members 26 against displacement.

A suitable fitting 34 provided with a reduced diameter threaded end portion 47 is screwed into the end of recess 18 and into abutting relationship with plug 22 contained therein. The other end of fitting 34 is suitably shaped to fit within the interior diameter of the fluid line 35. An axial hole 42 is provided in fitting 34 to admit fluid from line 35. Such fitting is preferably soldered or welded to line 35 as shown at 36 if such line is metallic, otherwise any conventional connection may be adapted for securing fitting 34 to the line.

Coupling member 20 is substantially cylindrical and has a cylindrical recess 37 in the rear end thereof. A threaded recess 38 is provided at the other end of such member in which is screwed the reduced diameter end 16 of housing 15 as will be later described. An axial stem portion 39 is integrally formed in the bottom of recess 38 and such stem portion has a conically shaped end as shown at 40 in Fig. 1. Stem portion 39 freely enters recess 19 provided in the end of housing 15 when member 20 is assembled to such housing. A plurality of transverse holes 48 radially disposed about the axis of coupling member 20 communicate between recess 38 and recess 37 thereby permitting fluid to flow therethrough as will be explained. The other end of coupling 20 is shaped to permit insertion thereof into another fluid line 41 and is suitably secured thereto.

In Fig. 2 housing 15 is shown assembled to one end of the fluid supply line 35 containing fluid under relatively high pressure. In such figure housing 15 is disconnected from coupling 20 and when so disconnected, the high pressure fluid contained in line 35 acts against the ends of closure members 26, forcing such members together whereby recess 19 is sealed, thus preventing escape of fluid therethrough. The closure members 26, when collapsed, as shown in the above mentioned figure, form a solid plug having a conically shaped end which engages the conical bore portion 21 seating itself therein to form an excellent seal.

When coupling member 20 is assembled to housing 15, the conical shaped end 40 of stem 39 enters the conical recess 32 on the front of the closed segment members 26 thereby forcing such members rearwardly against the conical end 25 provided on plug 22. The camming action of both of such conical ends forces the segment members 26 apart thereby opening passageway 42 so that fluid can pass from line 35 through transverse holes 24 in plug 22 around projection 39 in recess 19 through holes 48 in member 20 and finally into fluid line 41. Projection 43 in recess 33 permits the smooth transition and uninterrupted flow of fluid from hole 42 into holes 24 and projection 39 functions similarly to provide a smooth flow of fluid into holes 48.

It is apparent therefore that connection of a fluid line containing fluid under high pressure can be readily connected to another line containing no fluid by means of the device described herein. Such connection is rapidly made by screwing coupling 20 onto housing 15. When such joining is no longer desired, coupling 20 is easily unscrewed whereupon segment members 26 rapidly close thereby preventing any escape of the fluid contained in line 35. It is obvious to those skilled in the art that such arrangement would be particularly desirable when applied to coupling the air lines of railroad cars or truck trailers for actuation of the brake shoes. When disconnection of such coupling is effected, the escape of fluid from the feed line is effectively prevented by means of the segment members 26.

It is particularly desired to point out that the segment members 26 and even the plug member 22 lends itself to fabrication by the sintered metallic powdered process, whereby such components can be made to exacting dimensions in a simple press and sintering operation thereby eliminating the need for expensive machining. The other parts such as the housing 15 and coupling member 20 can be readily manufactured by screw machine methods.

When pressure is to be maintained in both fluid lines to be connected, a double ended coupling member 44 illustrated in Fig. 8 must be utilized. Member 44 is constructed substantially the same as coupling 20, however, such member is provided with a double ended, conically shaped, stem-like portion 45 integrally formed within member 44. A plurality of transverse holes 46 are radially disposed about the axis of stem portion 45 to permit the flow of fluid therethrough. If such a coupling is utilized, it will then be necessary to provide the housing 15 with its associated components on each end of the supply lines to be coupled to the double ended coupling. By means of such a device, pressure can be maintained in both of the supply lines.

From the foregoing description it is readily apparent that a valve coupling for joining fluid supply lines of simple and efficient design is hereby provided. Such coupling has no springs to weaken and has a passage closure member which is positive in action and is mechanically opened to insure passage of the fluid through such coupling. It is further pointed out that the coupling herein described is relatively easy and inexpensive to manufacture.

I claim:

1. A coupling for joining a line containing fluid under relatively high pressure to a line containing no fluid comprising, in combination, a valve housing adapted to be secured to the first mentioned line, said housing having an axial hole therethrough provided with a conical tapered portion, a valve insertable in said hole and adapted to seat in said conical portion, said valve including a plurality of floating segment-like members, each of said segments having a partial conical tapered end adapted to seat in said conical portion of said hole, said valve having a conical recess in each end thereof, a plug member secured within said axial hole having a projection thereon engageable with the rearmost recess of said valve, a coupling member adapted to be removably secured to said housing, said coupling member being secured to the last mentioned line, and means on said coupling arranged to force said valve rearwardly against said projection for separating said segment members to provide a passageway when said coupling member is joined to said housing whereby fluid can flow into the last mentioned line.

2. The combination defined in claim 1 wherein said last mentioned means comprises a stem-like projection in said coupling, adapted to engage the other conical recess in said valve to simultaneously force said valve rearwardly while separating said segment members.

GOTTHARD JANSON, Jr.

(References on following page)

REFERENCES CITED

The following references are of record in the file of this patent:

UNITED STATES PATENTS

| Number | Name | Date |
|---|---|---|
| 624,624 | Casey | May 9, 1899 |
| 949,329 | Pahlow | Feb. 15, 1910 |
| 1,345,571 | Yates | July 6, 1920 |
| 1,479,110 | Skelly | Jan. 1, 1924 |
| 2,333,423 | Hufferd | Nov. 2, 1943 |

FOREIGN PATENTS

| Number | Country | Date |
|---|---|---|
| 11,067 | Netherlands | Feb. 16, 1924 |
| 506,044 | Great Britain | May 22, 1939 |